US010547174B2

(12) United States Patent
Kuloor et al.

(10) Patent No.: US 10,547,174 B2
(45) Date of Patent: Jan. 28, 2020

(54) RANKING NETWORK ASSETS BASED ON DOWNSTREAM EVENTS AND MEASUREMENTS

(71) Applicant: LANDIS+GYR INNOVATIONS, INC., Alpharetta, GA (US)

(72) Inventors: Soorya Kuloor, Cary, NC (US); Chethana Kuloor, Cary, NC (US); Sravan Buggaveeti, Morrisville, NC (US)

(73) Assignee: Landis+Gyr Innovations, Inc., Alpharetta, GA (US)

(*) Notice: Subject to any disclaimer, the term of this patent is extended or adjusted under 35 U.S.C. 154(b) by 0 days.

(21) Appl. No.: 16/059,114

(22) Filed: Aug. 9, 2018

(65) Prior Publication Data

US 2019/0052080 A1 Feb. 14, 2019

Related U.S. Application Data

(60) Provisional application No. 62/543,631, filed on Aug. 10, 2017.

(51) Int. Cl.
*H02J 3/12* (2006.01)
*G06Q 50/06* (2012.01)
*H02J 3/00* (2006.01)

(52) U.S. Cl.
CPC ............. *H02J 3/12* (2013.01); *G06Q 50/06* (2013.01); *H02J 2003/001* (2013.01)

(58) Field of Classification Search
None
See application file for complete search history.

(56) References Cited

U.S. PATENT DOCUMENTS

| 10,404,390 | B2* | 9/2019 | Sadeghi | H04H 20/74 |
| 2006/0067226 | A1* | 3/2006 | Chandra | H04W 24/00 370/235 |

(Continued)

FOREIGN PATENT DOCUMENTS

| CN | 104156881 | 11/2014 |
| CN | 104166940 | 11/2014 |
| WO | 2016176064 | 11/2016 |

OTHER PUBLICATIONS

International Patent Application No. PCT/US2018/045892, "International Search Report and Written Opinion", Oct. 31, 2018, 13 pages.

*Primary Examiner* — Ryan A Jarrett
(74) *Attorney, Agent, or Firm* — Kilpatrick Townsend & Stockton LLP (57) ABSTRACT

A method for ranking network assets based on downstream events may include: receiving communications from one or more sensors in a power distribution network, the communications indicating the occurrence of a network event; calculating a probability of a network asset causing a problem indicated by the event for each network asset in an affected area of the network; calculating a spread probability of the network asset causing the problem for each network asset in the affected area of the network; based on the probability and the spread probability, calculating a probability of the network asset malfunctioning for each network asset in the affected area of the network; comparing the probability of the network asset malfunctioning to a threshold value; based on the comparison, determining a network asset having a highest probability of malfunctioning; and controlling one of more other network assets to mitigate the problem.

20 Claims, 3 Drawing Sheets

(56) References Cited

U.S. PATENT DOCUMENTS

| | | | |
|---|---|---|---|
| 2010/0036702 A1* | 2/2010 | Sitton | G06Q 10/04 |
| | | | 705/7.28 |
| 2015/0331035 A1* | 11/2015 | Li | G01R 31/086 |
| | | | 702/59 |
| 2018/0324150 A1* | 11/2018 | Al-Khabbaz | H04L 67/36 |
| 2019/0036339 A1* | 1/2019 | Wong | G05F 1/66 |

* cited by examiner

RANKING NETWORK ASSETS BASED ON DOWNSTREAM EVENTS AND MEASUREMENTS

CROSS-REFERENCES TO RELATED APPLICATIONS

This application claims the benefit of U.S. Provisional Application No. 62/543,631, filed Aug. 10, 2017. The contents of which are hereby incorporated herein by reference in their entirety.

BACKGROUND

Unless otherwise indicated herein, the materials described in this section are not prior art to the claims in this application and are not admitted to be prior art by inclusion in this section.

In a radial network that includes a large number of assets and sensors, it is important to determine likely causes of or significant contributors to a network condition. One example of a radial network is an electric distribution feeder that includes fuses, regulator banks, distribution transformers, and other types of assets, as well as sensors, such as meters and line sensors. The sensors may generate various events and measurements including, but not limited to, outage events and voltage measurements. An event or an anomaly in a measurement reported by a sensor may be due to problems with an asset upstream of the sensor. For example, an outage event or a voltage anomaly reported by a sensor may be the result of a tripped fuse or malfunctioning regulator banks upstream of the sensor.

SUMMARY

Systems and methods for ranking network assets based on downstream events and measurements are provided.

According to various aspects there is provided a method for ranking network assets based on downstream events. In some aspects, the method may include: receiving communications from one or more sensors in a power distribution network, the communications indicating the occurrence of a network event; calculating a probability of a network asset causing a problem indicated by the event for each network asset in an affected area of the network; calculating a spread probability of the network asset causing the problem for each network asset in the affected area of the network; based on the probability and the spread probability, calculating a probability of the network asset malfunctioning for each network asset in the affected area of the network; comparing the probability of the network asset malfunctioning to a threshold value; based on the comparison, determining a network asset having a highest probability of malfunctioning; and controlling one of more other network assets to mitigate the problem.

Calculating a probability of a network asset causing the event may include obtaining event information from the communications from the one or more sensors, where the event information includes a number of actual events that occurred downstream of the network asset for a specified time duration; and obtaining sensor and asset information, where the sensor and asset information includes a number of sensors that are capable of generating a specific type of event or measurement that are downstream of the network asset.

Calculating a spread probability of the network asset causing the event may include obtaining event information from the communications from the one or more sensors, where the event information includes a number of gating assets downstream of a specified asset with at least one event for a specified time duration; and obtaining sensor and asset information, where the sensor and asset information includes a number of gating assets downstream of the specified asset.

Calculating a probability of the network asset malfunctioning may include weighting the probability of a network asset causing the event and the spread probability of the network asset causing the event according to weights selected based on particular utility installation requirements. Calculating the probability of a network asset causing the problem and calculating the spread probability of the network asset causing the problem may be performed at a central location of the power distribution network.

Calculating the probability of a network asset causing the problem and the calculating the spread probability of the network asset causing the problem may be performed at a substation of the power distribution network. Calculating the probability of a network asset causing the problem and calculating the spread probability of the network asset causing the problem may performed at the substation of the power distribution network for one or more neighboring substations. The probabilities calculated at the substation may be communicated to a central location of the power distribution network.

According to various aspects there is provided a distribution network management system. In some aspects, the system may include: a storage device; a communications interface; and a control unit configured to communicate with the storage device and the communications interface.

The control unit may be configured to receive communications via the communications interface from one or more sensors in a power distribution network, the communications indicating the occurrence of a problem indicated by the network event; calculate a probability of a network asset causing the problem for each network asset in an affected area of the network; calculate a spread probability of the network asset causing the problem for each network asset in the affected area of the network; based on the probability and the spread probability, calculate a probability of the network asset malfunctioning for each network asset in the affected area of the network; compare the probability of the network asset malfunctioning for each network asset in the affected area of the network with a threshold value; based on the comparison, determine a network asset having a highest probability of malfunctioning; and based on the determination, control one of more other network assets to mitigate the event.

The control unit may be further configured to obtain event information from the communications from the one or more sensors received via the communications interface, where the event information may include a number of actual events that occurred downstream of the network asset for a specified time duration; and may communicate with the storage device to obtain sensor and asset information, wherein the sensor and asset information may include a number of sensors that are capable of generating a specific type of event or measurement that are downstream of the network asset.

The control unit may be further configured to obtain event information from the communications from the one or more sensors received via the communications interface, where the event information includes a number of gating assets downstream of the given asset with at least one event at a given time; and may communicate with the storage device to obtain sensor and asset information, where the sensor and asset information includes a number of gating assets downstream of the given asset. The control unit may be configured to weight the probability of a network asset causing the problem and the spread probability of the network asset causing the problem according to weights selected based on particular utility installation requirements.

The distribution network management system may be disposed at a central location of the power distribution network, and may be configured to perform the calculations for the probability of a network asset causing the problem and the spread probability of the network asset causing the problem at the central location of the power distribution network.

The distribution network management system may be disposed at a substation of the power distribution network, and may be configured to perform the calculations for the probability of a network asset causing the problem and the spread probability of the network asset causing the problem at the substation of the power distribution network. The distribution network management system may be disposed at a substation of the power distribution network, and may be configured to perform the calculations for the probability of a network asset causing the problem and the spread probability of the network asset causing the problem at the substation of the power distribution network for one or more neighboring substations. The probabilities calculated by the distribution network management system at the substation may be communicated to a central location of the power distribution network.

According to various aspects there is provided a method for ranking power distribution network assets based on downstream events. In some aspects, the method may include: receiving communications from one or more sensors in the power distribution network, the communications indicating the occurrence of a network event; calculating a probability of a power distribution network asset causing a problem indicated by the event for each power distribution network asset in an affected area of the network; calculating a spread probability of the power distribution network asset causing the problem for each power distribution network asset in the affected area of the network; based on the probability and the spread probability, calculating a probability of the power distribution network asset having a malfunction for each power distribution network asset in the affected area of the network; comparing the probability of the power distribution network asset having a malfunction for each power distribution network asset in the affected area of the network to a threshold value; based on the comparison, determining a power distribution network asset having a highest probability of malfunctioning; and based on the determination, controlling one of more other power distribution network assets to mitigate the problem.

The calculating the probability of a network asset causing the problem and the calculating the spread probability of the network asset causing the problem may be performed at a substation of the power distribution network for one or more neighboring substations, and the probabilities calculated by the substation may be communicated to a central location of the power distribution network.

Numerous benefits are achieved by way of the various embodiments over conventional techniques. For example, the various embodiments provide methods and systems that narrow down the number of potential assets in the network that may be causing or significantly contributing to a problem, while minimizing the number of events required to be reported to an analytics platform to recognize the problem. In some embodiments, probabilities are calculated taking into account both a probability of an asset being a cause of problem and a spread probability of the asset being a cause of the problem to identify problems using a fewer number of reported events. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Systems and methods for ranking network assets based on downstream events and measurements are provided. An event or an abnormal measurement may be an indication of a problem in a distribution network. For example, a problem may be a blown fuse, but electric meters may detect a power outage due to the blown fuse and report the outage as an event. As another example, a problem may be a stuck voltage regulator resulting in abnormal voltage measurements downstream of the stuck voltage regulator. Electric meters downstream from the stuck voltage regulator may detect the abnormal voltage measurements. Additionally, events may be generated by electric meters and/or sensors. Other events may be calculated or generated by the distribution network management system based on analysis of historical data. For example, based on the distribution network configuration, over- or under-voltage events may be calculated or generated by the distribution network management system.

In a real-time scenario, the method may result in the early detection of a system malfunction. In a non-real-time scenario, the method may result in more accurate identification of assets with malfunctions even when the number of events reported is much smaller. This accurate identification may result in the earlier diagnosis of a possible asset problem and may help to resolve a problem before it becomes a serious issue.

In accordance with various aspects of the present disclosure, if a single event is obtained from downstream of a gating asset, it will account for the probability of asset upstream of the gating asset. A gating asset may be a distribution transformer or any of various types of protection devices, for example, but not limited to, relays, fuses, etc. Gating assets may be used to categorize zones within a radial network. A zone may include a gating asset and other assets downstream of the gating asset. Gating assets may be used to measure a spread of events.

For example, if a power outage event is received from at least one meter from each of a majority of the distribution transformers downstream of a fuse, it may be confidently determined that the fuse is blown, enabling early decisions to be made regarding an outage event and its cause. As another example, if all of the electric meters downstream from a distribution transformer measure abnormally high voltages, it may be confidently determined that the transformer has failed. Similarly, if a large number of low voltages are detected downstream of a voltage regulator, it may be confidently determined that the regulator is not operating properly, or has improper control settings resulting in the low voltages. As a further example, if a plurality of electric meters are measuring power flickers or momentary outages downstream of an overhead line section in a vegetation rich area, it may be determined that there is a tree contact somewhere in that line section.

Figure 1:
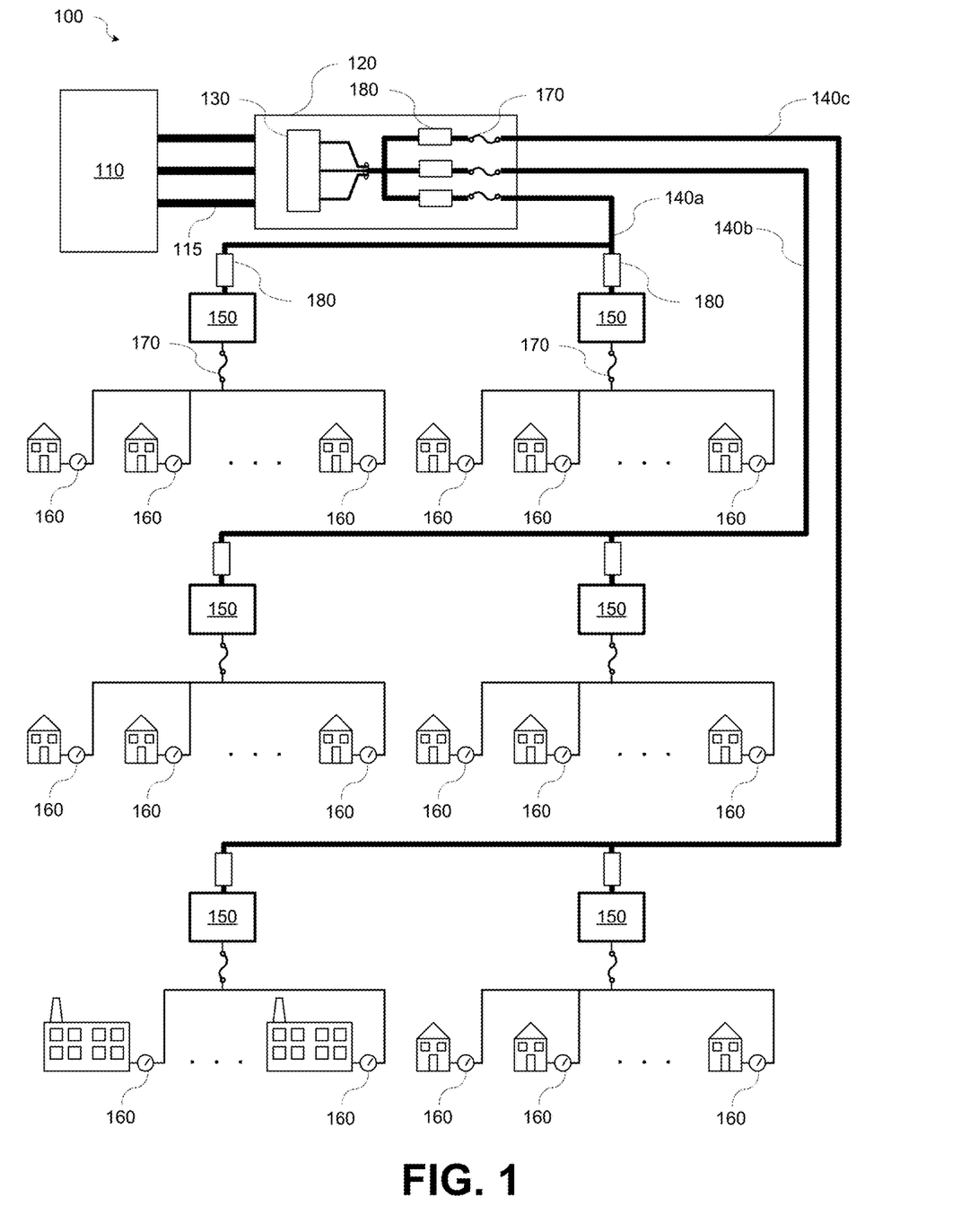
FIG. 1 is a block diagram illustrating an electrical power distribution system according to various aspects of the present disclosure.

FIG. 1 is a block diagram illustrating an electrical power distribution system 100 according to various aspects of the present disclosure. Referring to FIG. 1, an electrical power generation facility 110 may generate electrical power. The generated electrical power may be, for example, 3-phase alternating current (AC) power. In a three-phase power supply system, three conductors each carry an alternating current of the same frequency and voltage amplitude relative to a common reference, but with a phase difference of one third of a cycle between each. The electrical power may be transmitted at high voltage (e.g., ~140-750 kV) via transmission lines 115 to an electrical power substation 120.

At the electrical power substation 120 a step-down transformer 130 may step down the high voltage power to a voltage level more suitable for customer usage. The stepped down 3-phase power may be transmitted via feeders 140a, 140b, 140c to distribution transformers 150 which may further step down the voltage (e.g., 120-240V for residential customers). Each distribution transformer 150 may deliver single phase and/or 3-phase power to residential and/or commercial customers. From the distribution transformers 150, electrical power is delivered to the customers through electrical meters 160. The electric meters 160 may be supplied by the power utility company and may be connected between the loads (i.e., the customer premises) and the distribution transformers 150. In addition to 3-phase power, single phase power may be delivered from the distribution transformers 150 to various customers from different phases of the 3-phase power generated by the utility company resulting in uneven loading on the phases.

Fuses 170 and sensors 180 may be distributed throughout the network at various assets, for example, but not limited to, feeder circuits, distribution transformers, etc. The electric meters 160 may also act as a type of sensor. The sensors 180 may be, for example, but not limited to, meters, line sensors, etc. One of ordinary skill in the art will appreciate that other types of sensors may be used without departing from the scope of the present disclosure. The fuses 170 may interrupt the circuit in the case of a circuit fault (e.g., a short circuit). The sensors 180 may sense various network parameters, for example, frequency, voltage, current magnitude, and phase angle, to monitor operation of the network. One of ordinary skill in the art will appreciate that the illustrated locations of the sensors and fuses are merely exemplary and that sensors and/or fuses may be disposed at other locations and that additional or fewer sensors and/or fuses may be used without departing from the scope of the present disclosure.

A probability may be determined for each asset in the network based on the number of events or out of range measurements associated with sensors downstream of the asset and the number of events or out of range measurements associated with gating devices downstream of the asset. Two probabilistic parameters, $P_s$ and $P_{ss}$, may be defined for a given asset (e.g., fuse, line section, distribution transformer, etc.) in the network.

Equation 1 defines a probability, $P_s$, of the asset being a cause of an event:

$$P_s = E_s/N_s \qquad (1)$$

where
$E_s$ is a number of actual events that occurred downstream of the asset at a given time, and
$N_s$ is a number of sensors that are capable of generating a specific type of event or measurement that are downstream of the asset, Equation 2 defines a "spread" probability, $P_{ss}$, of the asset being a cause of the event:

$$Pss = Ess/Nss \qquad (2)$$

where
$E_{ss}$ is a number of gating assets downstream of a specified asset with at least one event for a specified time duration, and
$N_{ss}$ is a number of gating assets downstream of the specified asset.

For example, a gating asset may be a distribution transformer or fuse or any type of protective device. This number is used to measure the "spread" of the event.

A spread of an event may be a measure of a number of subgroups downstream of a specified asset in which at least one event is detected. Each subgroup may include a gating asset (e.g., a distribution transformer) and all of the assets downstream of the gating asset. The measure of the number of subgroups may be an indirect indication of the geographical spread of the event. For example, if a small number of subgroups out of a large number of subgroups detect events, then the events may be due to problems within the subgroups. If, however, a large number of the subgroups detect events, then the problem may be caused by an asset or condition upstream of the large number of subgroups. Thus, measuring the spread of events may minimize the number of events needed to make a determination of a problem. In accordance with various aspects of the present disclosure, real-time streaming of event reports may enable early detection of problems.

Using these probabilistic parameters, the probability of an asset experiencing a malfunction (e.g., causing a power outage, exhibiting degraded performance, etc.) may be determined by Equation 3:

$$P = W_s P_s + W_{ss} P_{ss} \qquad (3)$$

where $W_s$ and $W_{ss}$ are weights, and $W_s + W_{ss} = 1$. The values for $W_s$ and $W_{ss}$ may be selected manually per utility installation requirements. Initial values for the weights $W_s$ and $W_{ss}$ may be 0.5 and 0.5, respectively, or another value, to provide equal weights for the actual event and the spread of the event. The weights may vary depending on communication systems that report real-time events. A higher value for $W_{ss}$ may be selected in cases where the communication system reports events in a distributed fashion. In this case, the higher value weight for the event spread may result in early detection of a problem.

One of ordinary skill in the art will appreciate that other ways of selecting the values may also be used without departing from the scope of the present disclosure. The values for $W_s$ and $W_{ss}$ may be adjusted over time and may be different for different networks.

The probability P of an asset experiencing a malfunction for every asset in an impacted part of the radial network may be calculated. In one example, an impacted part of the network may be associated with a power outage. The probability P of an asset experiencing a malfunction for each asset in the impacted part of the radial network may be compared to a given threshold, for example, a 65% confidence factor or another confidence factor. The threshold may be selected in any number of ways and may be adjusted over time.

Different thresholds may be used for different networks. Those assets with a probability of experiencing a malfunction that exceeds the threshold may be considered to be malfunctioning. The asset that is closest to the root node of the radial network and that has a probability of experiencing a malfunction that exceeds the threshold may be determined to be the cause of the problem. One of ordinary skill in the art will appreciate that other ways of identifying a likely cause of a problem are also possible and may consider factors other than the distance to the root node. For example, an asset with a high probability that is the child (i.e., immediately downstream) of a low probability asset may be considered as a likely cause of a problem.

In accordance with various aspects of the present disclosure, when a sensor downstream of a gating asset reports an event, the sensor may be considered in the probability for an asset upstream of the gating asset. In one example, the asset may be a fuse, the gating assets a may be distribution transformers, and the sensors may be electric meters. Multiple distribution transformers may be disposed downstream of the fuse, and multiple meters may be disposed downstream of each distribution transformer. An outage event communicated from at least one meter downstream of a majority of the multiple distribution transformers may cause the system, based at least in part on the calculation of probability P of an asset experiencing a malfunction for each asset in the impacted part of the radial network, to identify the fuse which is upstream of the multiple distribution transformers as the asset causing the power outage. Accordingly, the system may make an early decision regarding actions to take regarding the power outage event and its cause.

In accordance with various aspects of the present disclosure, problems may be identified in many different circumstances, for example, but not limited to:

Early identification of outage causing devices using meter last gasp signals or outage events.

Early identification of nested outages in cases of restoration scenarios using meter power-on signals.

Early identification of malfunctioning voltage control devices and distribution transformers using voltage exceptions.

Early identification of malfunctioning assets or risk of outage using momentary outage signals from the meters and sensors.

The use of both the probability $P_s$ and the spread probability $P_{ss}$ may enable identification of malfunctions using a fewer number of reported events. Using only the probability $P_s$ to identify a malfunction may involve receiving reports for a significant number of events before a decision can be made. The time required for receiving multiple event reports may result in delayed detection of problems. If the impact of a problem is wide spread (i.e., a large number of events are detected/reported), then there may be a higher probability that an asset that is upstream of all of those events is the cause of the problem. Therefore, including the spread probability $P_{ss}$ may enable earlier identification of problems.

Figure 2:
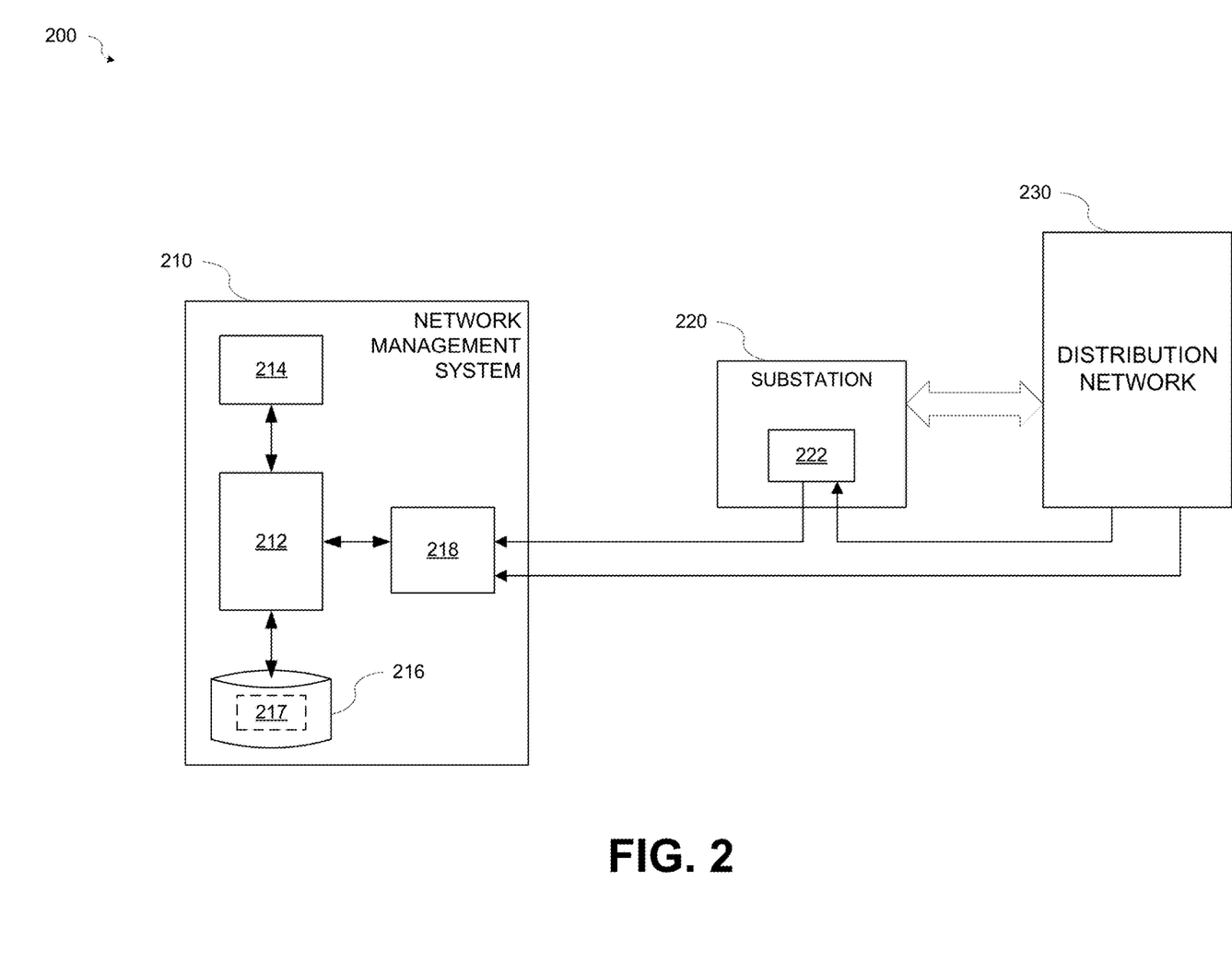
FIG. 2 is a simplified block diagram of a power distribution management system according to various aspects of the present disclosure.

FIG. 2 is a simplified block diagram of a power distribution management system 200 according to various aspects of the present disclosure. Referring to FIG. 2, the power distribution management system 200 may include a distribution network management system 210, a substation 220, and a distribution network 230. The distribution network management system 210 may include a control unit 212, a memory 214, a storage device 216, and a communications interface 218. The control unit 212 may be, for example, but not limited to, a processor, microprocessor, microcomputer, computer, microcontroller, programmable controller, or other programmable device. One of ordinary skill in the art will appreciate that other variations may be implemented without departing from the scope of the present disclosure.

The memory 214 may be, for example, but not limited to, one or more solid state memory devices or other memory devices. The memory 214 may store data and instructions for operation and control of the distribution network management system 210. The storage device 216 may be, for example, but not limited to, one or more hard-disk drives, solid-state memory devices, or other computer-readable storage media. One of ordinary skill in the art will appreciate that other storage configurations may be used without departing from the scope of the present disclosure. A database 217 may be stored on the storage device 216.

The distribution network management system 210 may communicate with one or more substations 220 and the storage device 216 via the communications interface 218. Different wired or wireless communication interfaces and associated communication protocols may be implemented by the communication interface 218 for communication with different devices. For example, a wired communication interface may be implemented between the control unit 212 of the distribution network management system 210 and the storage device 216, while a wireless communication interface may be implemented for communication between the distribution network management system 210 and the one or more substations 220. The distribution network management system 210 may be located at a central location or at a substation or somewhere in between. One of ordinary skill in the art will appreciate that other communications configurations may be used without departing from the scope of the present disclosure.

The substation 220 may include a data acquisition unit 222. The data acquisition unit 222 may receive communications from sensors (e.g., the sensors 180) in the distribution network 230. For example, the acquisition unit 222 may receive communications from the sensors 180 related to various distribution network parameters such as frequency, voltage, current magnitude, and phase angle. The data acquisition unit 222 of the substation 220 may forward the communications from the sensors to the distribution network management system 210. In some embodiments, the distribution network management system 210 may receive communications from sensors which may not be transmitted via the substation but via a communications network.

Based on communications received from the data acquisition unit 222 of the substation 220, the control unit 212 may calculate the probability $P_s$ and the spread probability $P_{ss}$ for each asset in the affected area of the network using Equations 1 and 2, respectively. The values for $E_s$ (i.e., the number of actual events that occurred downstream of the asset at a given time) and $E_{ss}$ (i.e., the number of gating assets downstream of the given asset with at least one event at a given time) may be obtained from the communications received from the data acquisition unit 222 of the substation 220. The values for $N_s$ (i.e., the number of sensors that are capable of generating a specific type of event or measurement that are downstream of the asset) and $N_{ss}$ (i.e., the number of gating assets downstream of the given asset) may be stored in the database 217 in the storage device 216 and may be retrieved by the control unit 212.

After the control unit 212 calculates the probability $P_s$ and the spread probability $P_{ss}$ for each asset in the affected area of the network, the control unit 212 may calculate the probability P of an asset malfunctioning using Equation 3. The values for $W_s$ and $W_{ss}$ may be selected manually based on the particular requirements of the power utility installation. The control unit 212 may compare the probability P of an asset experiencing a malfunction for each asset in the affected area of the network malfunctioning to one or more thresholds. Based on the results of the comparison, the control unit 212 may determine which of the assets has the highest probability of causing the problem. The control unit 212 may cause the distribution network management system 210 to take one or more actions, for example, control one of more other assets to mitigate the event (e.g., redirect power to circumvent the malfunctioning asset).

In some embodiments, the distribution network management system 210 may be located at a substation. The distribution network management system 210 located at the substation may receive the communications from the sensors and calculate the probability $P_s$ and the spread probability $P_{ss}$ for each asset connected to the substation. The distribution network management system 210 located at the substation may report results of the calculations for the assets connected to the substation to a central location of the utility installation.

In some embodiments, the distribution network management system 210 located at the substation may calculate the probability $P_s$ and the spread probability $P_{ss}$ for each asset connected to itself and may calculate the probability $P_s$ and the spread probability $P_{ss}$ for each asset connected to one or more neighboring substations. The distribution network management system 210 located at the substation may report results of the calculations for the assets connected to the itself and the one or more neighboring substations to a central location of the utility installation. One of ordinary skill in the art will appreciate that other configurations for implementing the distribution network management system may be used without departing from the scope of the present disclosure.

Figure 3:
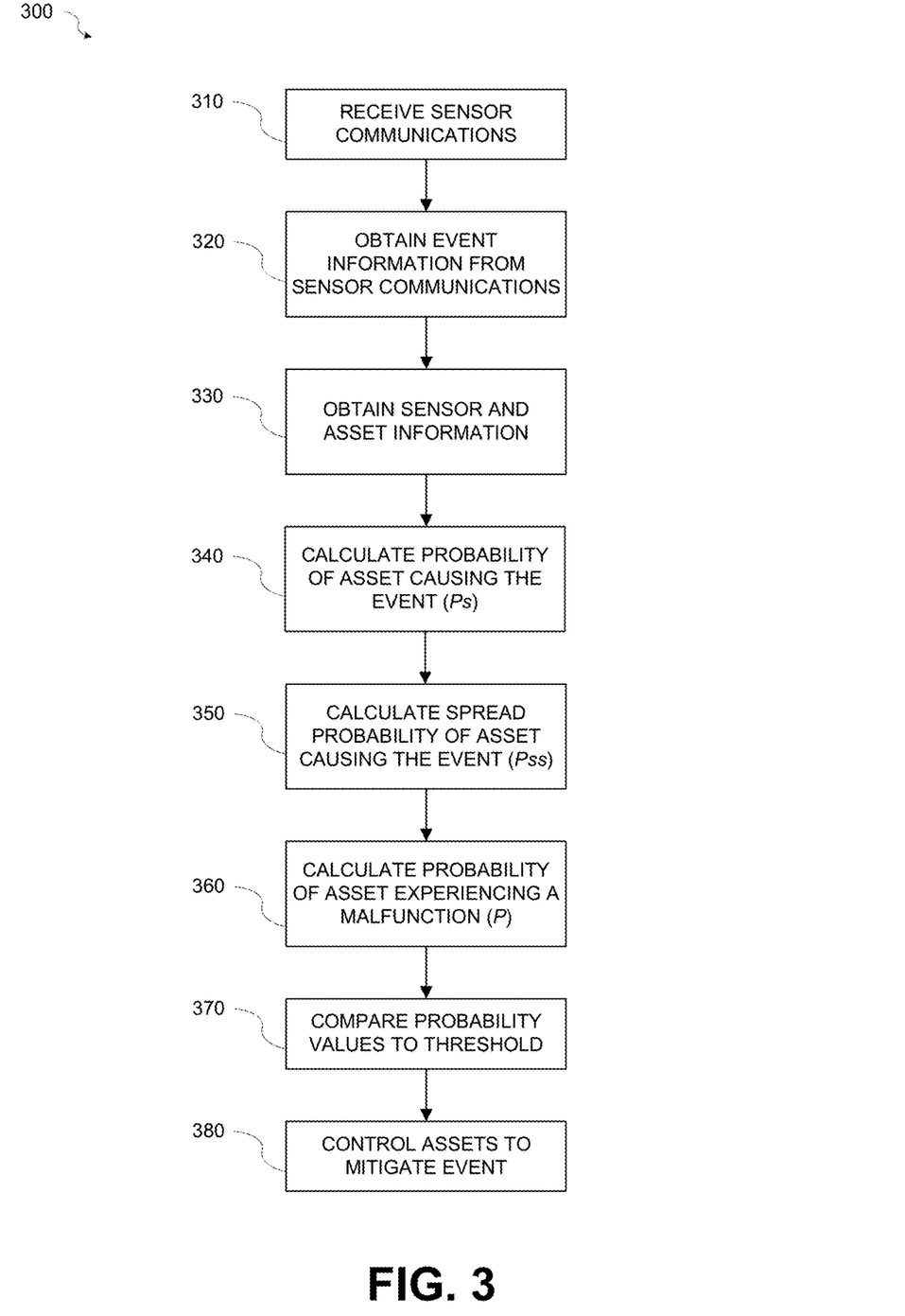
FIG. 3 is a flowchart of a method for ranking network assets based on downstream events according to various aspects of the present disclosure.

FIG. 3 is a flowchart of a method for ranking network assets based on downstream events according to various aspects of the present disclosure. Referring to FIG. 3, at block 310, sensor communications may be received. For example, the data acquisition unit 222 of one or more substations 220 may receive communications from the sensors 180 related to various distribution network parameters such as frequency, voltage, current magnitude, and phase angle. The data acquisition unit 222 of the substation 220 may forward the communications from the sensors to the distribution network management system 210.

At block 320, event information may be obtained from the sensor communications. The event information may include, for example, but not limited to, the number of actual events that occurred downstream of the asset at a given time, the number of gating assets downstream of the given asset with at least one event at a given time, etc. The control unit 212 of the distribution network management system 210 may extract event information from the sensor communications received from the one or more substations 220. At block 330, sensor and asset information may be obtained. The control unit 212 may access sensor and asset information from the database 217 in the storage device 216. The sensor and asset information may include, for example, but not limited to, the number of sensors that are capable of generating a specific type of event or measurement that are downstream of the asset, the number of gating assets downstream of the given asset, etc.

At block 340, the probability of an asset being a cause of the event may be calculated. Based on the number of actual events that occurred downstream of the asset at a given time ($E_s$) obtained from the received sensor communications and the number of sensors that are capable of generating a specific type of event or measurement that are downstream of the asset ($N_s$) obtained from the database, the control unit 212 may calculate a probability, $P_s$, of each asset in the affected area of the network being a cause of an event, for example, using Equation 1.

At block 350, the spread probability of the asset causing the event may be calculated. Based on the number of gating assets downstream of the given asset with at least one event at a given time ($E_{ss}$) obtained from the received sensor communications, and the number of gating assets downstream of the given asset ($N_{ss}$) obtained from the database, the control unit 212 may calculate a spread probability, $P_{ss}$, of the each asset in the affected area of the network being a cause of an event, for example, using Equation 2.

At block 360, the probability of an asset experiencing a malfunction may be calculated. Based on the calculation of the probability $P_s$ and the spread probability $P_{ss}$ for each asset in the affected area of the network, the control unit 212 may calculate a probability P of each asset in the affected area of the network malfunctioning, for example, using Equation 3. The values for the weights, $W_s$, and $W_{ss}$, may be selected manually based on the particular requirements of the power utility installation.

At block 370, the probability values may be compared to a threshold. The control unit 212 may compare the probability P of each asset in the affected area of the network malfunctioning to a specified threshold value. When the probability P of an asset exceeds the specified threshold value, the control unit 212 may determine that the asset may have a malfunction related to the event.

At block 380, assets may be controlled to mitigate the event. Based on the results of the comparison, the control unit 212 may determine which of the assets has the highest probability of malfunctioning. The control unit 212 may cause the distribution network management system 210 to take one or more actions, for example, control one of more other assets to mitigate the event (e.g., redirect power to circumvent the malfunctioning asset).

The method 300 may be embodied on a non-transitory computer readable medium, for example, but not limited to, the memory 214 or other non-transitory computer readable medium known to those of skill in the art, having stored therein a program including computer executable instructions for making a processor, computer, or other programmable device execute the operations of the methods.

In accordance with various aspects of the present disclosure, multiple types of problems that occur in a power distribution network, for example, a radial power distribution network, may be identified. While specific examples have been described, embodiments in accordance with the present disclosure are not limited by those implementations. The method is not limited to those issues identified above or to the types of assets used in the foregoing examples. The method may use different types of events, may use sensed or measured information, such as voltage measurements, may use status information, or other types of information that are indicative of the issue. The type of event or measurement used may be selected based on the type of asset(s) in the network.

Networks may include a combination of different types of assets, so multiple events and/or types of information may be collected from the sensors. A sensor may be separate from an asset (e.g., located upstream or downstream of the asset) or the sensors may be associated with the asset (e.g., co-located with the asset).

The communication of the event or measurement may use wired or wireless communications. The communication may be included as part of a regular communication from a sensor or may be a separate communication. The communication of the event or information from a sensor may use the same network that connects the assets and sensors or may use a separate network.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for ranking network assets based on downstream events, the method comprising:
   receiving communications from one or more sensors in a power distribution network, the communications indicating the occurrence of a network event;
   calculating a probability of a network asset causing a problem indicated by the event for each network asset in an affected area of the network;
   calculating a spread probability of the network asset causing the problem for each network asset in the affected area of the network;
   based on the probability and the spread probability, calculating a probability of the network asset malfunctioning for each network asset in the affected area of the network;
   comparing the probability of the network asset malfunctioning for each network asset in the affected area of the network to a threshold value;
   based on the comparison, determining a network asset having a highest probability of malfunctioning; and
   based on the determination, controlling one of more other network assets to mitigate the problem.

2. The method of claim 1, wherein the calculating a probability of a network asset causing the event comprises:
   obtaining event information from the communications from the one or more sensors, wherein the event information includes a number of actual events that occurred downstream of the network asset for a specified time duration; and
   obtaining sensor and asset information, wherein the sensor and asset information includes a number of sensors that are capable of generating a specific type of event or measurement that are downstream of the network asset.

3. The method of claim 1, wherein the calculating a spread probability of the network asset causing the event comprises:
   obtaining event information from the communications from the one or more sensors, wherein the event information includes a number of gating assets downstream of a specified asset with at least one event for a specified time duration; and
   obtaining sensor and asset information, wherein the sensor and asset information includes a number of gating assets downstream of the specified asset.

4. The method of claim 1, wherein the calculating a probability of the network asset malfunctioning comprises weighting the probability of a network asset causing the event and the spread probability of the network asset causing the event according to weights selected based on particular utility installation requirements.

5. The method of claim 1, wherein the calculating the probability of a network asset causing the problem and the calculating the spread probability of the network asset causing the problem is performed at a central location of the power distribution network.

6. The method of claim 1, wherein the calculating the probability of a network asset causing the problem and the calculating the spread probability of the network asset causing the problem is performed at a substation of the power distribution network.

7. The method of claim 6, wherein the probabilities calculated at the substation are communicated to a central location of the power distribution network.

8. The method of claim 1, wherein the calculating the probability of a network asset causing the problem and the calculating the spread probability of the network asset causing the problem is performed at the substation of the power distribution network for one or more neighboring substations.

9. The method of claim 8, wherein the probabilities calculated at the substation are communicated to a central location of the power distribution network.

10. A distribution network management system, comprising:
    a storage device;
    a communications interface; and
    a control unit configured to communicate with the storage device and the communications interface,
    wherein the control unit is configured to:
    receive communications via the communications interface from one or more sensors in a power distribution network, the communications indicating the occurrence of a problem indicated by the network event;
    calculate a probability of a network asset causing the problem for each network asset in an affected area of the network;
    calculate a spread probability of the network asset causing the problem for each network asset in the affected area of the network;
    based on the probability and the spread probability, calculate a probability of the network asset malfunctioning for each network asset in the affected area of the network;

compare the probability of the network asset malfunctioning for each network asset in the affected area of the network with a threshold value;

based on the comparison, determine a network asset having a highest probability of malfunctioning; and based on the determination, control one of more other network assets to mitigate the event.

11. The system of claim 10, wherein to calculate a probability of a network asset causing the event the control unit is configured to:

obtain event information from the communications from the one or more sensors received via the communications interface, wherein the event information includes a number of actual events that occurred downstream of the network asset for a specified time duration; and communicate with the storage device to obtain sensor and asset information, wherein the sensor and asset information includes a number of sensors that are capable of generating a specific type of event or measurement that are downstream of the network asset.

12. The system of claim 10, wherein to calculate a spread probability of a network asset causing the event the control unit is configured to:

obtain event information from the sensor communications received via the communications interface, wherein the event information includes a number of gating assets downstream of the given asset with at least one event at a given time; and communicate with the storage device to obtain sensor and asset information, wherein the sensor and asset information includes a number of gating assets downstream of the given asset.

13. The system of claim 10, wherein to calculate a probability of the network asset malfunctioning the control unit is configured to weight the probability of a network asset causing the problem and the spread probability of the network asset causing the problem according to weights selected based on particular utility installation requirements.

14. The system of claim 10, wherein the distribution network management system is disposed at a central location of the power distribution network, and the distribution network management system is configured to perform the calculations for the probability of a network asset causing the problem and the spread probability of the network asset causing the problem at the central location of the power distribution network.

15. The system of claim 10, wherein the distribution network management system is disposed at a substation of the power distribution network, and the distribution network management system is configured to perform the calculations for the probability of a network asset causing the problem and the spread probability of the network asset causing the problem at the substation of the power distribution network.

16. The system of claim 15, wherein the probabilities calculated by the distribution network management system at the substation are communicated to a central location of the power distribution network.

17. The system of claim 10, wherein the distribution network management system is disposed at a substation of the power distribution network, and the distribution network management system is configured to perform the calculations for the probability of a network asset causing the problem and the spread probability of the network asset causing the problem at the substation of the power distribution network for one or more neighboring substations.

18. The system of claim 17, wherein the probabilities calculated by the distribution network management system at the substation are communicated to a central location of the power distribution network.

19. A method for ranking power distribution network assets based on downstream events, the method comprising:

receiving communications from one or more sensors in the power distribution network, the communications indicating the occurrence of a network event;

calculating a probability of a power distribution network asset causing a problem indicated by the event for each power distribution network asset in an affected area of the network;

calculating a spread probability of the power distribution network asset causing the problem for each power distribution network asset in the affected area of the network;

based on the probability and the spread probability, calculating a probability of the power distribution network asset having a malfunction for each power distribution network asset in the affected area of the network;

comparing the probability of the power distribution network asset having a malfunction for each power distribution network asset in the affected area of the network to a threshold value;

based on the comparison, determining a power distribution network asset having a highest probability of malfunctioning; and based on the determination, controlling one of more other power distribution network assets to mitigate the problem.

20. The method of claim 19, wherein the calculating the probability of a network asset causing the problem and the calculating the spread probability of the network asset causing the problem is performed at a substation of the power distribution network for one or more neighboring substations, and the probabilities calculated by the substation are communicated to a central location of the power distribution network.

* * * * *